(12) United States Patent
Nishino et al.

(10) Patent No.: US 8,996,908 B1
(45) Date of Patent: Mar. 31, 2015

(54) INFORMATION SYSTEM, HOST SYSTEM AND ACCESS CONTROL METHOD

(71) Applicant: Hitachi, Ltd., Tokyo (JP)

(72) Inventors: Ryota Nishino, Tokyo (JP); Kazuhiro Ooyama, Tokyo (JP); Satoshi Kadoiri, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/343,347

(22) PCT Filed: Sep. 30, 2013

(86) PCT No.: PCT/JP2013/076526
§ 371 (c)(1),
(2) Date: Mar. 6, 2014

(51) Int. Cl.
*G06F 11/00* (2006.01)
*G06F 11/20* (2006.01)
*G06F 3/06* (2006.01)
*G06F 11/10* (2006.01)

(52) U.S. Cl.
CPC .......... *G06F 11/2056* (2013.01); *G06F 3/0619* (2013.01); *G06F 3/067* (2013.01); *G06F 3/0655* (2013.01); *G06F 11/2071* (2013.01); *G06F 11/1076* (2013.01)
USPC .......................................................... 714/6.24

(58) Field of Classification Search
CPC .......... G06F 17/30197; G06F 11/1076; G06F 11/2056; G06F 11/2071; G06F 3/0635
See application file for complete search history.

(56) References Cited

U.S. PATENT DOCUMENTS

| | | | |
|---|---|---|---|
| 6,941,396 B1* | 9/2005 | Thorpe et al. | 710/74 |
| 7,636,801 B1* | 12/2009 | Kekre et al. | 710/31 |
| 2002/0026603 A1* | 2/2002 | LeCrone et al. | 714/6 |
| 2005/0210317 A1* | 9/2005 | Thorpe et al. | 714/6 |
| 2008/0104346 A1 | 5/2008 | Watanabe et al. | |
| 2008/0162605 A1 | 7/2008 | Tsuchiya | |
| 2008/0229039 A1 | 9/2008 | Maki et al. | |
| 2013/0318297 A1* | 11/2013 | Jibbe et al. | 711/114 |

FOREIGN PATENT DOCUMENTS

| | | |
|---|---|---|
| JP | 2008-134988 A | 6/2006 |
| JP | 2008-165431 A | 7/2008 |
| JP | 2008-225753 A | 9/2008 |
| JP | 2009-266120 A | 11/2009 |

* cited by examiner

*Primary Examiner* — Charles Ehne
(74) *Attorney, Agent, or Firm* — Volpe and Koenig, P.C.

(57) ABSTRACT

A first SS (storage system) provides a first SA (storage area), a second SS provides a second SA, and first and second HSs (host systems) are coupled to the first and second SSs. First and second paths connect the first HS to the first and second SAs. Third and fourth paths connect the second HS to the first and second SAs. When the first path has a higher priority than the second path after recovery where a WR (write request) is permitted to be transmitted to the first SS, if the first SA which is a write destination for the received WR is a target in a data mirroring process, the first SS transmits a notification to stop the process. The second SS performs control such that a WR specifying the second SA as a write destination fails, and then the second HS transmits the WR using the third path.

15 Claims, 14 Drawing Sheets

Fig. 5

VOL management table 322

| Port# (322a) | V# (322b) | R# (322c) | Capacity (322d) | Attribute (322e) |
|---|---|---|---|---|
| 01 | 01 | 11 | 100 GB | Global configuration RVOL Corresponding RG information |
| .... | .... | .... | .... | .... |

Fig. 6

Pair management table 323

| R# (323a) | VOL status (323b) | Counterpart storage # (323c) | Counterpart R# (323d) | Copy status (323e) | Copying direction (323f) |
|---|---|---|---|---|---|
| 11 | PVOL | 2 | 21 | PAIR | Normal |
| .... | .... | .... | .... | .... | .... |

Fig. 7

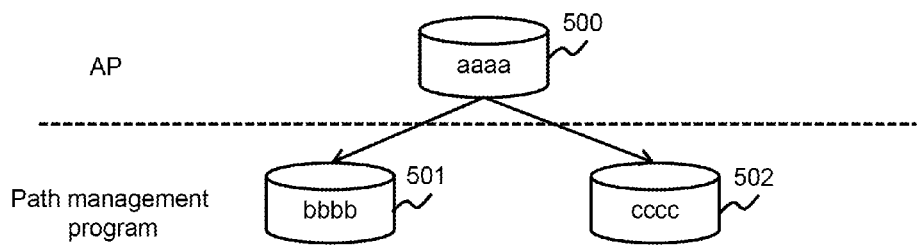

AP

Path management program

Fig. 8

Device file management table 126

| Virtual device file (126a) | Physical device file 1 (126b) | Physical device file 2 (126c) |
|---|---|---|
| aaaa | bbbb | cccc |
| .... | .... | .... |

Fig. 9

Path management table 125

| ID | Model | Virtual information | | | Physical information | | | Path status | PVOL failure | Physical device file |
|---|---|---|---|---|---|---|---|---|---|---|
| | | Storage S/N | Port # | LDEV ID | Storage S/N | Port # | LDEV ID | | | |
| 01 | AAA | 0001 | 01 | 01 | - | - | - | Online | No | bbbb |
| 02 | AAA | 0001 | 01 | 01 | 0002 | 01 | 21 | Online standby | No | cccc |
| ... | ... | ... | ... | ... | ... | ... | ... | ... | ... | ... |

125a 125b 125h 125c 125i 125j 125k 125d 125l 125m 125e 125f 125g

US 8,996,908 B1

INFORMATION SYSTEM, HOST SYSTEM AND ACCESS CONTROL METHOD

TECHNICAL FIELD

The present invention generally relates to access control, for example, control access to a plurality of logical volumes provided by a plurality of storage systems.

BACKGROUND ART

There is a technique of multiplexing storage apparatuses to improve the usability of a storage apparatus that stores data (see PTL 1). According to PTL 1, an information system including a first storage apparatus storing original data and a second storage apparatus storing duplicated data (duplication of the original data) is configured so that when a host computer fails to access the first storage apparatus, the host computer accesses the second storage apparatus to maintain continuous access.

CITATION LIST

Patent Literature

[PTL 1]
Japanese Patent Application Laid-open No. 2009-266120

SUMMARY OF INVENTION

Technical Problem

According to PTL 1, when there are a plurality of host computers, recovery from a failure cannot be carried out in a scalable manner.

Solution to Problem

An information system includes a first storage system configured to provide a first storage area, a second storage system configured to provide a second storage area paired with the first storage area, and a first host system and a second host system coupled to the first and second storage systems and configured to transmit write requests.

In a first system status (status where the information system is normal), the first and second storage systems perform a first remote data mirroring process in which the first storage area is a source, and the second storage area is a target. A first path connecting the first host system to the first storage area is in a status representing that the first path has a higher priority than a second path connecting the first host system to the second storage area. A third path connecting the second host system to the first storage area is in a status representing that the third path has a higher priority than a fourth path connecting the second host system to the second storage area.

In a second system status (status that is brought about when the first storage system fails a process according to the write request received from the first or second host system, each of the first and third paths is in a status representing inhibition of transmission of the write request using the path. The first and second storage systems stop the first remote data mirroring process.

In a third system status (status that represents recovery in the second system status to a situation where the first and second host systems are permitted to transmit the write requests to the first storage system), the first and second storage systems perform a second remote data mirroring process in which the second storage area is a source, and the first storage area is a target. The first path is in a status representing that the priority of the first path is lower than the priority of the second path. The third path is in a status representing that the priority of the third path is lower than the priority of the fourth path.

Upon transition to a status representing that the priority of the first path is higher than the priority of the second path in the third system status, the first host system transmits the write request to the first storage system using the first path. The first storage system receives the write request from the first host system, detects that the first storage area which is a write destination according to the received write request is the target in the second remote data mirroring process, transmits a stop notification to stop the second remote data mirroring process to the second storage system, and stops the second remote data mirroring process. The second storage system receives the stop notification, and changes control so that a write request specifying the second storage area as a write destination fails. The second host system transmits the write request specifying the second storage area as the write destination to the second storage system using the fourth path, and transmits the write request using the third path which is in a status representing that the priority of the third path is lower than the priority of the fourth path when the write request fails.

Advantageous Effects of Invention

Recovery from a failure can be carried out in a scalable manner.

BRIEF DESCRIPTION OF DRAWINGS

FIG. 5 is a configuration diagram of an example of a VOL management table.

FIG. 6 is a configuration diagram of an example of a pair management table.

FIG. 7 is a diagram illustrating management of a virtual device file and a physical device file.

FIG. 8 is a configuration diagram of an example of a device file management table.

FIG. 9 is a configuration diagram of an example of a path management program.

DESCRIPTION OF EMBODIMENTS

An embodiment is described with reference to the drawings.

While there are cases in the description below where information in the present invention is described with an expression such as "aaa table," the information may be expressed in a form such as a table other than a data structure. Therefore, in order to show non-dependency upon a data structure, "aaa table" or the like may be referred to as "aaa information."

An ID (Identifier) or a number is used as information for identifying a target in the following description, but is replaceable with other types of identification information.

Although the following describes a process with a program used as a subject in some cases, a program is run by a processor (e.g., CPU (Central Processing Unit)) to perform a specified process using storage resources (e.g., memory) and/or a communication interface as needed, the subject that performs the process may be a processor or a computer having the processor. In addition, a hardware circuit that performs a part or all of a process to be performed by a processor may be included. A computer program may be installed onto the apparatus. A program source may be, for example, a program distributing server or a storage medium readable by a computer.

The terms used in the following description specify as follows. "VOL" is the abbreviation of a logical volume, and is a logical storage device. VOL may be a real VOL (RVOL) or a virtual VOL (VVOL). In addition, VOL may be an online VOL that is provided to an external apparatus (e.g., server apparatus) coupled to a storage system that provides the VOL, or an offline VOL that is not provided to an external apparatus (that is not recognized by an external apparatus). "RVOL" is a VOL based on a physical storage resource that a storage system having the RVOL has (e.g., RAID (Redundant Array of Independent (or Inexpensive) Disks) group including a plurality of PDEVs).

Figure 1:
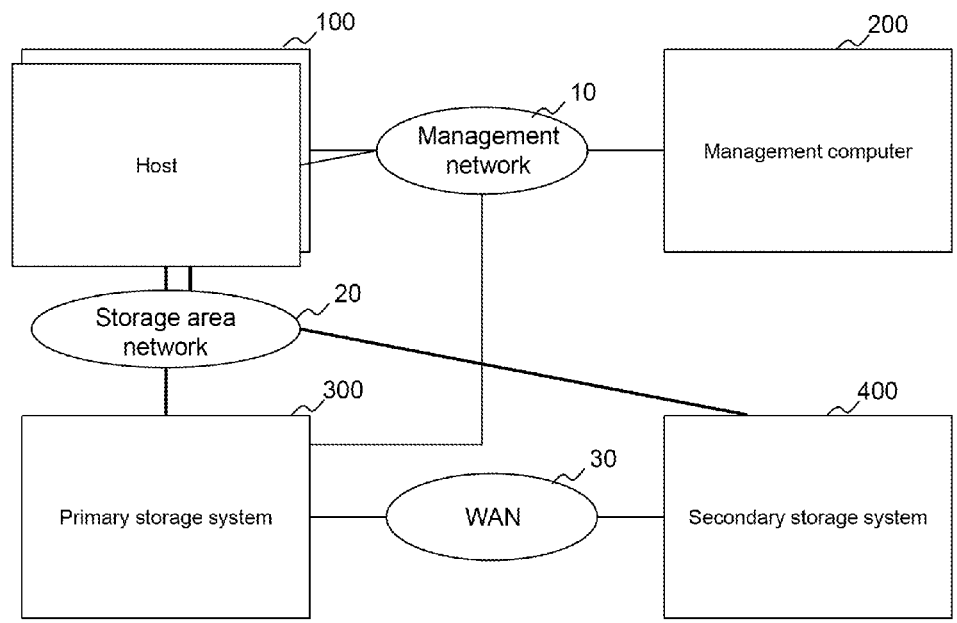
FIG. 1 is a configurational diagram of an information system according to an embodiment.

FIG. 1 is a configurational diagram of an information system according to an embodiment.

The information system includes a host computer (hereinafter referred to as "host") 100 as one example of a host system, a management computer 200, a primary storage system 300 as one example of a first storage system, and a secondary storage system 400 as one example of a second storage system. According to the embodiment, the information system includes a plurality of hosts 100. The hosts 100, the management computer 200, and the primary storage system 300 are connected over a management network 10. The hosts 100, the primary storage system 300, and the secondary storage system 400 are connected over a storage area network (SAN) 20. The primary storage system 300 is coupled to the secondary storage system 400 over a wide area network 30. The wide area network 30 may be, for example, a TCP/IP network, or a fiber-channel based network. The management computer 200 includes an input device, so that the management computer 200 can make various configurations to, and send instructions or the like to, the primary storage system 300 and the secondary storage system 400.

Figure 2:
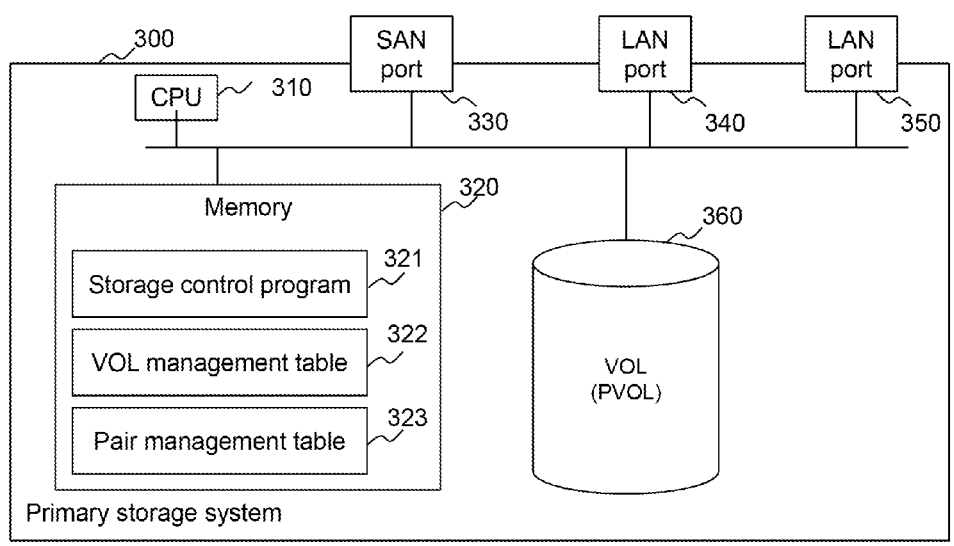
FIG. 2 is a configurational diagram of a main storage system.

FIG. 2 is a configurational diagram of the primary storage system 300.

The primary storage system 300 includes a CPU 310, a memory 320, a SAN port 330, a LAN port 340, a LAN port 350, and a PVOL (primary VOL) 360 as one example of a first storage area. The CPU 310, the memory 320, the SAN port 330, the LAN port 340, the LAN port 350, and the PVOL 360 are coupled to one another in a communicatable manner by internal buses.

The CPU 310 runs various programs stored in the memory 320 to perform various processes. The memory 320 stores various programs and various kinds of information. According to the embodiment, the memory 320 stores a storage control program 321, a VOL management table 322, and a pair management table 323. The storage control program 321 writes data into the PVOL 360 in response to a write request from a host 100. The storage control program 321 controls a remote data mirroring process to copy data written in the PVOL 360 to an SVOL (secondary volume) 440 to be described later. The storage control program 321 also controls a remote data mirroring process to copy data written in the SVOL 440 to the PVOL 360. A manager can manually configure the execution and termination of the remote data mirroring process by the storage control program 321, and the copying direction in the remote data mirroring process using the management computer 200.

The SAN port 330 is an interface device to connect the primary storage system 300 to another apparatus (e.g., host 100) over the storage area network 20. The LAN port 340 is an interface device to connect the primary storage system 300 to another apparatus (e.g., management computer 200) over the management network 10. The LAN port 350 is an interface device to connect the primary storage system 300 to another apparatus (e.g., secondary storage system 400) over the wide area network 30.

The PVOL 360 is a volume formed by a storage area in a storage device such as an HDD (Hard Disk Drive), and stores data used in an application program (which is also referred to as "AP") of a host 100 (e.g., generated data).

Figure 3:
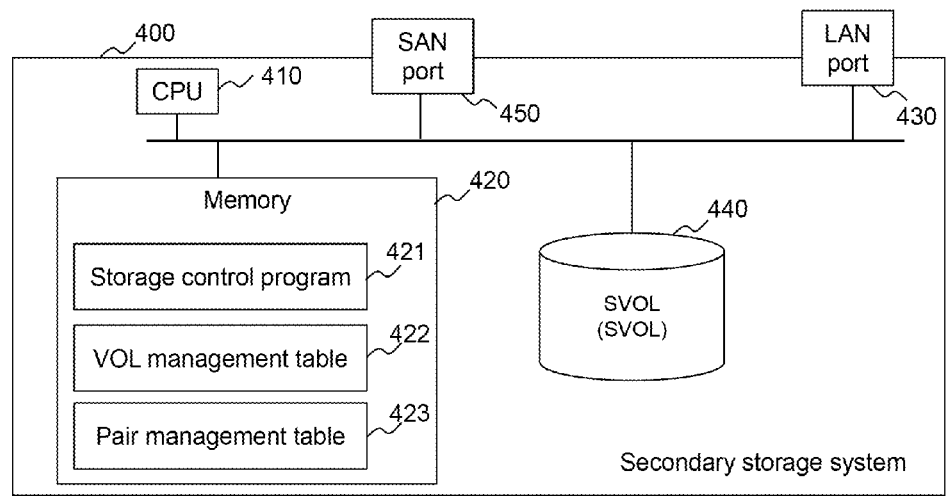
FIG. 3 is a configurational diagram of a secondary storage system.

FIG. 3 is a configurational diagram of the secondary storage system 400.

The secondary storage system 400 includes a CPU 410, a memory 420, a LAN port 430, an SVOL (secondary VOL) 440 as one example of a second storage area, and a SAN port 450. The CPU 410, the memory 420, the LAN port 430, the SAN port 450, and the SVOL 440 are coupled to one another in a communicatable manner by internal buses.

The CPU 410 runs various programs stored in the memory 420 to perform various processes. The memory 420 stores various programs and various kinds of information. According to the embodiment, the memory 420 stores a storage control program 421, a VOL management table 422, and a pair management table 423. The storage control program 421 controls a remote data mirroring process to copy data in the PVOL 360 to the SVOL 440. The storage control program 421 also controls a remote data mirroring process to copy data in the SVOL 440 to the PVOL 360, i.e., copying in the opposite direction. A manager can manually configure the execution and termination of the remote data mirroring process by the storage control program 421, and the copying direction in the remote data mirroring process using the management computer 200. The configurations of the VOL management table 422 and the pair management table 423 are the same as those of the VOL management table 322 and the pair management table 323 of the primary storage system 300.

The LAN port 430 is an interface device to connect the secondary storage system 400 to another apparatus (e.g., primary storage system 300) over the wide area network 30. The SAN port 450 is an interface device to connect the secondary storage system 400 to another apparatus (e.g., host 100) over the storage area network 20.

The SVOL 440 is a volume formed by a storage area in a storage device such as an HDD. The SVOL 440 is used to manage the same data as the PVOL 360 does, i.e., it is used to store a copy of data in the PVOL 360, in normal mode, and is used in place of the PVOL 360 when a failure occurs in the PVOL 360.

Figure 4:
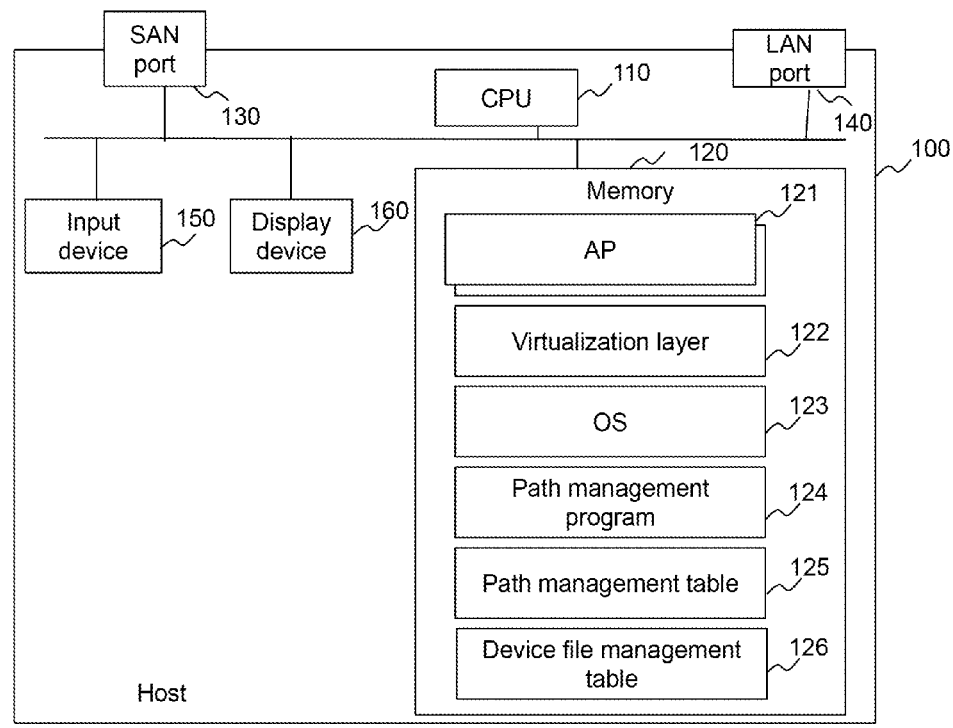
FIG. 4 is a configuration diagram of a host.

FIG. 4 is a configuration diagram of the host 100.

The host 100 includes a CPU 110, a memory 120, a SAN port 130, a LAN port 140, an input device 150, and a display device 160. The CPU 110, the memory 120, the SAN port 130, the LAN port 140, the input device 150, and the display device 160 are coupled to one another in a communicatable manner.

The CPU 110 runs various programs stored in the memory 120 to perform various processes. The memory 120 stores various programs and various kinds of information. According to the embodiment, the memory 120 stores an AP 121, a virtualization layer 122, an OS (Operating System) 123, a path management program 124, a path management table 125, and a device file management table 126.

The virtualization layer 122 may include a hypervisor. The virtualization layer 122 performs a process of forming a virtual machine in a host 100, and moving a virtual machine in a host 100 to another host 100. An execution image of a virtual machine or data used by the virtual machine may be stored in, for example, the PVOL 360 of the primary storage system 300. The virtualization layer 122 can give a virtual machine to the virtualization layer 122 of another host 100 to move the virtual machine to move the virtual machine to that host 100. In such a case, the another host 100 to which the virtual machine is moved accesses the PVOL 360 of the primary storage system 300. Accordingly, a plurality of hosts 100 may transmit an I/O request targeting the same PVOL 360 of the primary storage system 300.

The OS 123 is a basic program for permitting another program to run on the host 100. The path management program 124 is a program that manages paths to be used at the time of accessing a VOL stored in the primary storage system 300 or the secondary storage system 400.

The SAN port 130 is an interface device to connect the host 100 to another apparatus (e.g., primary storage system 300 or secondary storage system 400) over the storage area network 20. The LAN port 140 is an interface device to connect the host 100 to another apparatus (e.g., management computer 200, primary storage system 300 or the like) over the management network 10.

The path management table 125 is an input apparatus such as a keyboard or a mouse, and receives various inputs from the user of the host 100. The display device 160 is a display apparatus such as a liquid crystal display to display various kinds of information.

FIG. 5 is a configuration diagram of an example of the VOL management table 322.

The VOL management table 322 has a record having a Port#322a, V#322b, R#322c, capacity 322d, and attribute 322e for each VOL.

The Port#322a represents the port number (#) of a port (port of the storage system) with which the VOL is associated. The V#322b represents a virtual number. A VOL virtual number is a global number included in physical information to be described later that is notified to the host 100. The capacity 322d represents the capacity of the VOL. The attribute 322e represents the attribute of the VOL. The attribute of the VOL is a global configuration to provide the host 100 with, for example, a PVOL and an SVOL as a single VOL, a local configuration to provide the host 100 with a PVOL and an SVOL as separate VOLs, corresponding PG information specifying a RAID group (RAID level, the quantity PDEV (physical devices), the type of the PDEV, the number of the PDEV, etc.) that is the basis of the RVOL, or the like.

FIG. 6 is a configuration diagram of an example of the pair management table 323.

The pair management table 323 manages a record having R#323a, a VOL status 323b, a counterpart storage #323c, counterpart R#323d, a copy status 323e, and a copying direction 323f for each copy pair.

The R#323a represents the real number of a local VOL (VOL in a storage system having this table 323) that forms a copy pair. The VOL status 323b represents whether the local VOL is a PVOL or an SVOL. The counterpart storage #323c represents the storage # of a storage system having a counterpart VOL that forms a copy pair with the local VOL. The counterpart R#323d represents the real number of the counterpart VOL. The copy status 323e represents a copy status (status of a copy pair). The copy statuses include "PAIR" indicating that data in the PVOL matches with data in the SVOL, "COPY" indicating that copying between VOLs is in progress, and "SUSPEND" indicating a status where even when data is input to a single VOL, the other VOL is not updated. The copying direction 323f represents the copying direction in a copy pair. The copying directions include a forward direction (Normal) with the PVOL being a source and the SVOL being a target, and a reverse direction (Reverse) with the SVOL being a source and the PVOL being a target.

FIG. 7 is a diagram illustrating management of a virtual device file and a physical device file.

In managing the PVOL 360 and the SVOL 440 as a single VOL, a physical device file 501 corresponding to the PVOL and a physical device file 502 corresponding to the SVOL are managed in association with a virtual device file 500 corresponding to a single virtualized VOL of the PVOL and the SVOL. In this case, the AP 121 of the host 100 specifies the virtual device file 500 to gain access thereto. The path management program 124 recognizes the physical device files 501 and 502 corresponding to the virtual device file 500 specified by the AP 121 by referring to the device file management table 126, selects a path corresponding to one of the physical device files based on the path status by referring to the path management table 125, and gains access using that path.

FIG. 8 is a configuration diagram of an example of the device file management table 126.

The device file management table 126 manages a recording having a virtual device file 126a, a physical device file 1 126b, and a physical device file 2 126c for each virtual device file.

The virtual device file 126a represents the file name of a virtual device file (virtual device file name). The physical device file 1 126b represents the file name of a physical device file corresponding to the virtual device file and where the PVOL is mounted. The physical device file 2 126c represents the file name of a physical device file corresponding to the virtual device file and where the SVOL is mounted.

FIG. 9 is a configuration diagram of an example of the path management program 125.

The path management table 125 manages a recording having an ID 125a, a model 125b, virtual information 125c, physical information 125d, a path status 125e, a PVOL failure 125f, and a physical device file 125g. The virtual information 125c includes a storage S/N 125h, port#125i, and LDEV ID 125j. The physical information 125d includes a storage S/N 125k, port#125l, and LDEV ID 125m.

The ID 125a is an ID assigned to a path. The model 125b represents the model name of a storage system. The storage S/N 125h is the S/N (Serial Number) of the storage system. The Port#125i is the number of the port of the storage system. The LDEV ID 125j is the virtual number (V#) of the VOL associated with the path. Each information element in the virtual information 125c is global information on the VOL having a global structure, and is provided from the storage system.

The storage S/N 125k is the S/N (Serial Number) of a storage system. The Port#125l is the number of the port of the storage system. The LDEV ID 125m is the real number (R#) of the VOL associated with the path. Each information element in the physical information 125d is provided from the storage system when the VOL provided in the storage system is the SVOL that is an element having a global structure.

The path status 125e represents the status of a path. The path statuses include online, online standby, online (S), online (D), and offline (E). The online (first priority status) is a status having the highest priority, and represents that the path is used by priority. The online (second priority status) represents that the path is used when an online path is not present in paths associated with the VOL to be accessed. The online (S) represents that the path can be set back to online by manipulation by a user. The online (D) (third priority status) represents that the path becomes usable when a predetermined error response is received as described later. The offline (E) (use inhibited) represents that the use of the path is inhibited.

The PVOL failure 125f represents whether there is a failure in the PVOL with which the path is associated. The PVOL failure 125f is updated by the path management program 124 to information indicating the occurrence of a failure in the PVOL when a failure has occurred in the PVOL. The physical device file 125g represents the name of a physical device file corresponding to the VOL with which the path is associated.

Figure 13:
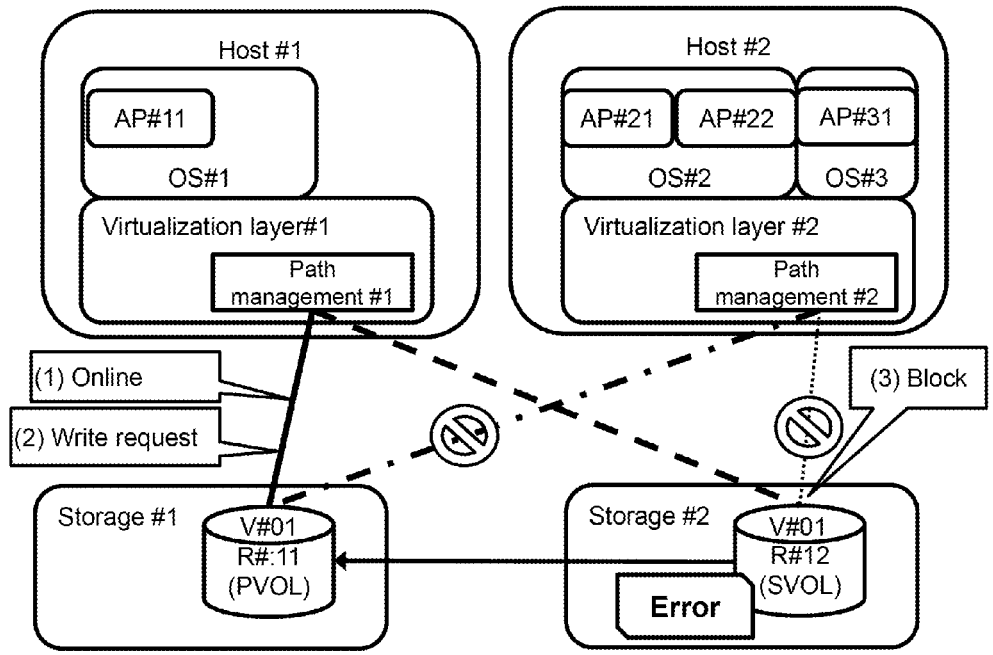
FIG. 13 is a diagram illustrating a first problem associated with a Comparative Example.
Figure 14:
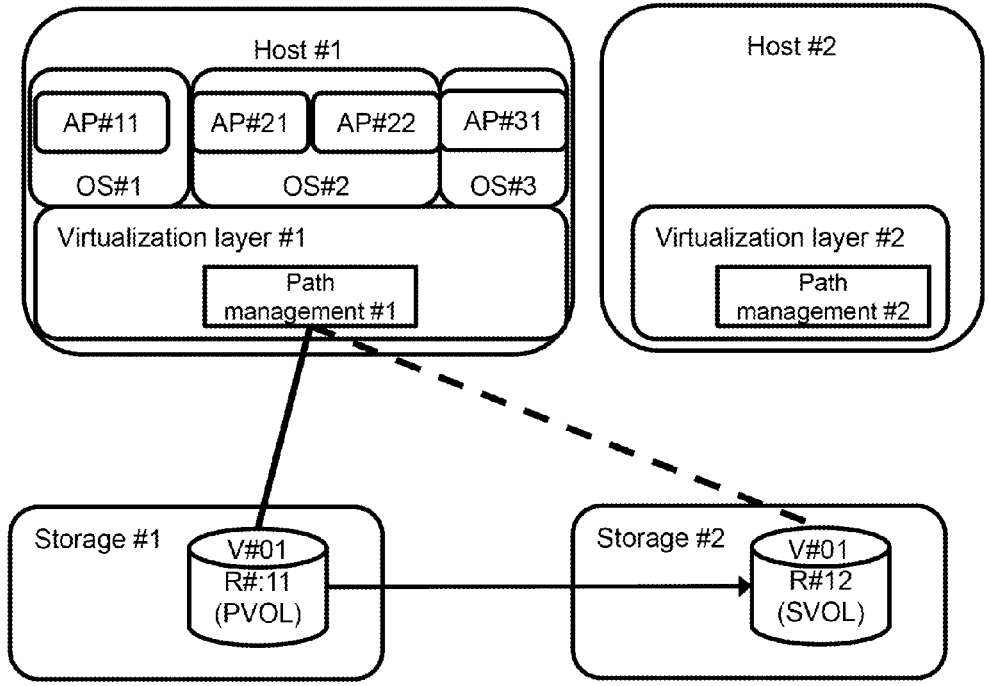
FIG. 14 is a diagram illustrating a second problem associated with the Comparative Example.

Next, a process that is performed in the embodiment is described referring to FIGS. 10 to 12 and FIGS. 15 to 19. In the following description, a storage #1 is the primary storage system 300, a storage #2 is the secondary storage system 400, each of hosts #1 and #2 is host 100, each of AP #11, #21, #22 and #31 is an AP 121, each of virtualization layers #1 and #2 is a virtualization layer 122, each of OS #1 and OS #2 is an OS 123, and each of path managements #1 and #2 is a path management program 124. In the following description, a path connecting the host #1 to the VOL with R#11 (PVOL) is called "first path," and a path connecting the host #1 to the VOL with R#12 (SVOL) is called "second path." Likewise, a path connecting the host #2 to the PVOL is called "third path," and a path connecting the host #2 to the SVOL is called "fourth path." As will be described later, FIGS. 13 and 14 are diagrams which are referred to in describing a Comparative Example for the embodiment. For the sake of convenience, the description of the Comparative Example uses the same numbers as the aforementioned numbers (numbers illustrated in FIGS. 10 to 12 and FIGS. 15 to 19) for easier understanding of the correlation between the components of the Comparative Example and the components of the embodiment. It is to be noted that the Comparative Example is merely an example used to describe problems, and should not necessarily include the components of the embodiment.

Figure 10:
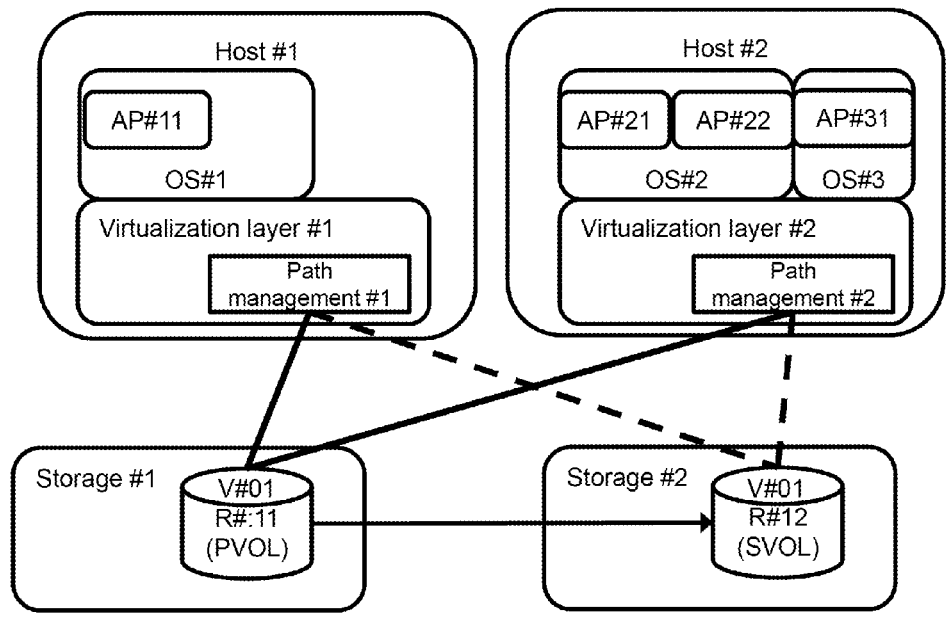
FIG. 10 is a diagram illustrating the normal status of an information system.

In the example of FIG. 10, in the host #1, the virtualization layer #1 executes a single virtual machine, in which the AP #11 is executed on the OS #1. In the host #2, the virtualization layer #2 executes two virtual machines, in one of which the APs #21 and #22 are executed on the OS #2 and in the other one of which the AP #31 is executed on an OS #3. As illustrated in FIG. 10, before the status becomes the normal status (first system status), the path managements #1 and #2 acquire information needed to configure the path management table 125 from the storages #1 and #2, respectively. The storage #1 that manages the PVOL with a global structure transmits virtual information on the PVOL to the path managements #1 and #2.

The storage #2 that manages the SVOL with a global structure acquires virtual information from the storage #1, and transmits the virtual information and physical information to the path managements #1 and #2.

The path managements #1 and #2 register information received from the storages #1 and #2 in the path management table 125. Each of the path managements #1 and #2 can recognize that a path corresponding to a record where virtual information is set but physical information is not set as a path associated with the PVOL, and can recognize that a path corresponding to a record where virtual information and physical information are set as a path associated with the SVOL. Further, each of the path managements #1 and #2 can recognize that VOLs corresponding to records that have the same virtual information set therein as a single VOL that is virtually managed.

In FIG. 10, the PVOL and the SVOL form a copy pair (VOL pair), and are virtually managed as a single VOL that is identified by the V#01. The storages #1 and #2 perform forward copying from the PVOL to the SVOL (first remote data mirroring process).

In the host #1, the status of the first path is online (solid line), and the status of the second path is online standby (dashed line). Therefore, when the AP #11 generates a write request specifying the VOL of V#01 as a write destination, the path management #1 transmits the write request using the first path (online path).

In the host #2, the status of the third path is online, and the status of the fourth path is online standby. Therefore, when the AP #21, AP #22 or AP #31 generates a write request specifying the VOL of V#01 as a write destination, the path management #2 transmits the write request using the third path (online path).

Figure 11:
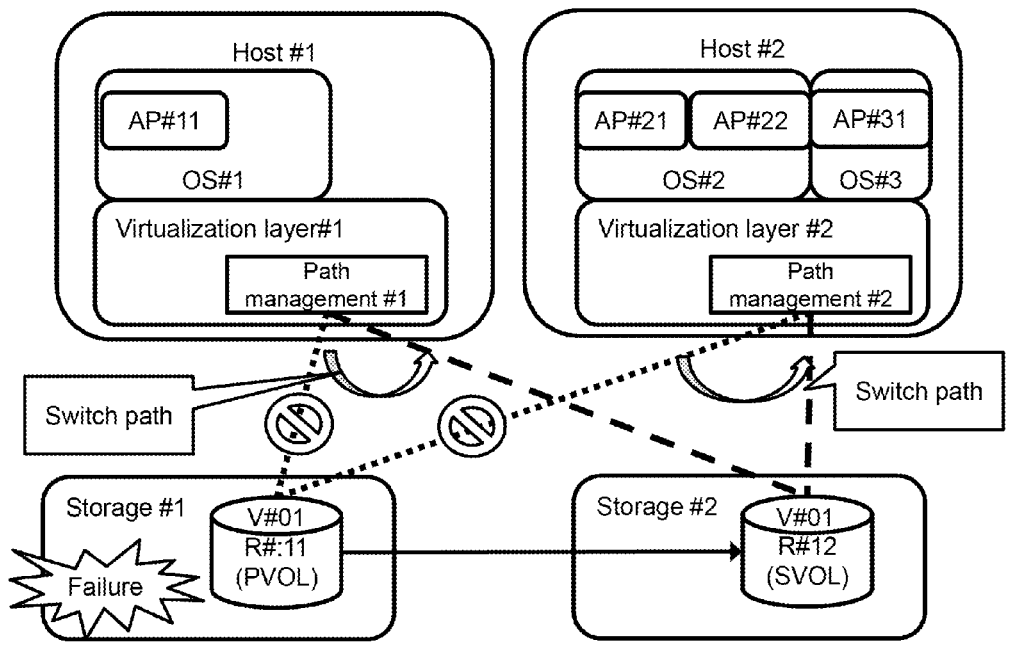
FIG. 11 is a diagram illustrating a status when a failure occurs in the information system.

It is assumed that the information system is in a status where a failure has occurred in the information system (e.g., a failure in the storage #1) so that access to the PVOL is not enabled (second system status) as illustrated in FIG. 11.

In this status, the host #1 cannot complete writing even if a write request is transmitted using the first path (online path), the host #1 executes a failover. Specifically, the path management #1 changes the status of the first path corresponding to the VOL of V#01 to offline (E) (fine dashed line with a prohibition mark) to switch the path to be used in transmitting the write request specifying the VOL of V#01 as a write destination to the second path (online standby path). Accordingly, the AP #11 can resume a work using the SVOL in the storage #2.

Likewise, the path management #2 changes the status of the third path corresponding to the VOL of V#01 to offline (E) to switch the path to be used in transmitting the write request specifying the VOL of V#01 as a write destination to the fourth path (online standby path). Accordingly, the AP of the host #2 can resume a work using the SVOL in the storage #2.

Figure 12:
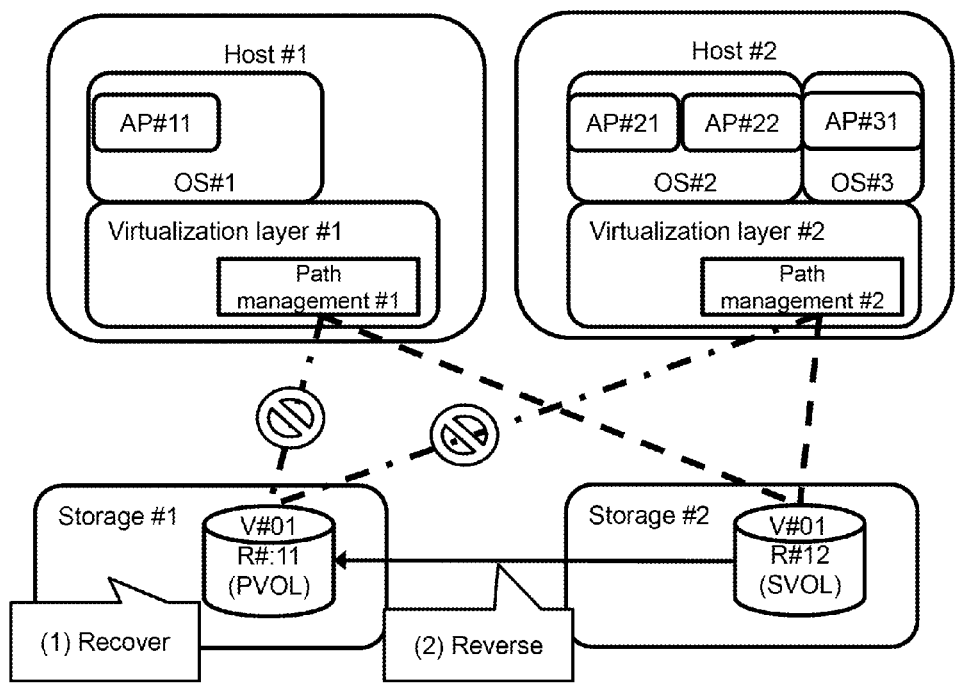
FIG. 12 is a diagram illustrating a status immediately after recovery from a failure in the information system.

As illustrated in FIG. 12, as recovery from a failure as illustrated in FIG. 11 in a failing section (e.g., storage #1) is done ((1) in FIG. 12) after the occurrence of the failure, the storage #1 comes to a status where the storage #1 can receive a write request to the PVOL from the host (third system status). In this case, the storages #1 and #2 start performing reverse copying (remote data mirroring process with the opposite copying direction) ((2) in FIG. 12). The execution of the reverse copying by the storages #1 and #2 starts when the storage #1 receives an instruction for reverse copying. Accordingly, data in the SVOL used by the storages #1 and #2 can be coped into the PVOL after a failure occurs. The instruction for reverse copying may be transmitted from the host #1, #2, or the management computer 200.

When detecting that the first path is usable by sending a predetermined command (dummy command intended to detect if a path is normal) using the first path, the path management #1 changes the status of the first path to online (S) (long dashed short dashed line with a prohibition mark) ((3) in FIG. 12). Likewise, when detecting that the third path is usable by sending the predetermined command using the third path, the path management #2 changes the status of the third path to online (S) ((3) in FIG. 12).

It is now assumed that as illustrated in FIG. 13, the path management #1 automatically has changed the status of the first path from online (S) to online ((1) in FIG. 13) in response to an instruction from the user of the host #1 or the management computer 200 after the status illustrated in FIG. 12. Thereafter, the path management #1 transmits a write request specifying the PCOL as a write destination using the first path. When the storage #1 receives the write request from the host #1 ((2) in FIG. 13), the storage control program 321 of the storage #1 notifies the storage #2 of the writing into the PVOL, and the notified storage #2 blocks the SVOL ((3) in FIG. 13).

Accordingly, the storage #2 is not permitted to access the SVOL using the fourth path. At this time, the status of the third path is online (S), so that it is not preferable for the host #2 to use the third path without involving a manager. As a result, the AP of the host #2 needs to stop working.

A possible way of avoiding such a problem is to move every virtual machine that runs on the host #2 to the host #1 as illustrated in FIG. 14. However, this increases the load on the host #1.

To overcome such a problem, the embodiment performs the following process.

Figure 15:
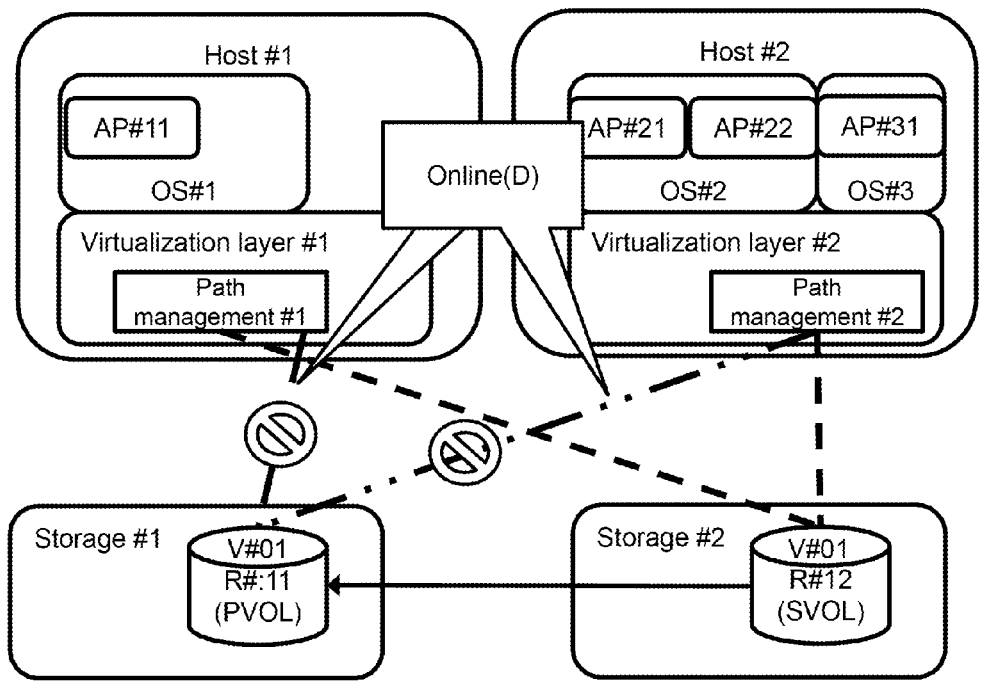
FIG. 15 is a first diagram illustrating a process after recovery from a failure.

First, the path managements #1 and #2 change the status of the path in the online (S) status from online (S) to online (D) (long dashed double-short dashed line with a prohibition mark) as illustrated in FIG. 15.

Figure 16:
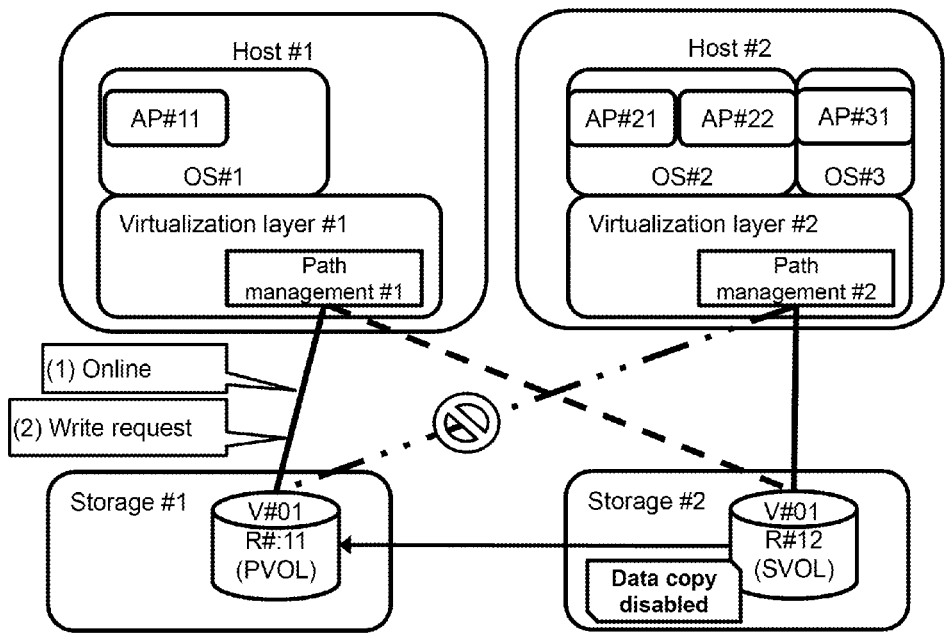
FIG. 16 is a second diagram illustrating the process after recovery from the failure.

Next, as illustrated in FIG. 16, the path management #1 changes the status of the first path from online (D) to online automatically (or in response to an instruction from the user of the host #1 or the management computer 200) ((1) in FIG. 16). Then, the path management #1 transmits a write request specifying the PVOL as a write destination using the first path.

Thereafter, when the storage #1 receives the write request specifying the PVOL as a write destination from the host #1 ((2) in FIG. 16), the storage control program 321 of the storage #1 performs writing into the PVOL in response to the write request, and transmits an error notification to the storage #2 to prevent reverse copying from being carried out. Whether the write request specifies the PVOL which is the copy target as a write destination can be specified from the pair management table 323. The storage #2 that has received the error notification performs control to disable data copying into the SVOL so that a write request specifying the SVOL as a write destination is not accepted. When there is a difference between the PVOL and the SVOL, reading data from the SVOL may not be preferable in some cases. Therefore, the storage #2 may perform control so that in addition to the write request, a read request specifying the SVOL as a read source is not accepted.

Figure 17:
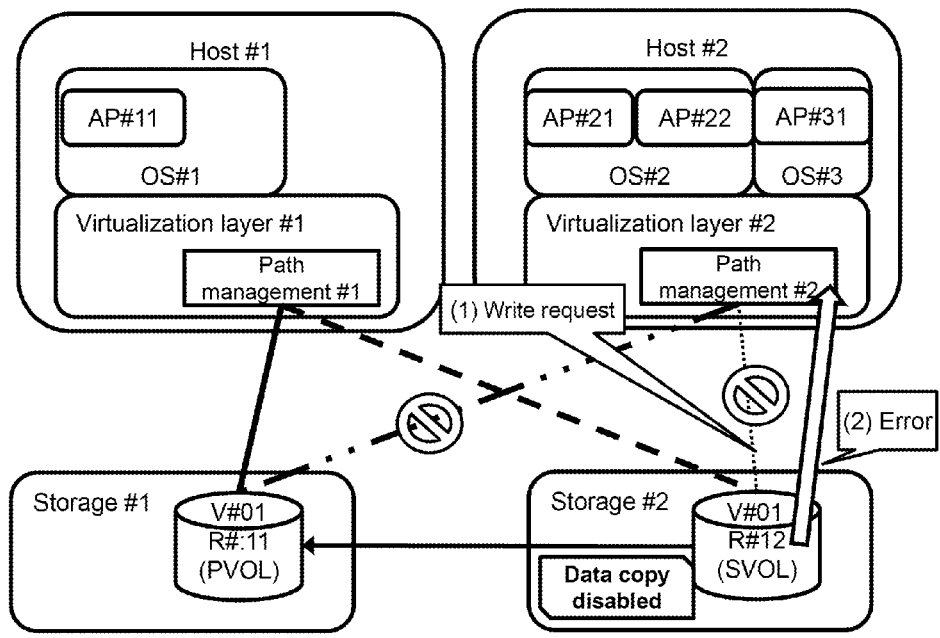
FIG. 17 is a third diagram illustrating the process after recovery from the failure.

Thereafter, when the storage #2 receives a write request specifying the SVOL as a write destination from the host #2 as illustrated in FIG. 17 ((1) in FIG. 17), the storage control program 421 of the storage #2 performs control so that the write request specifying the SVOL as a write destination is not accepted, and therefore returns a predetermined error response to the host #2 ((2) in FIG. 17). When the host #2 receives the predetermined error response, the path management #2 changes the status of the fourth path to online (E) (fine dashed line with a prohibition mark).

Figure 18:
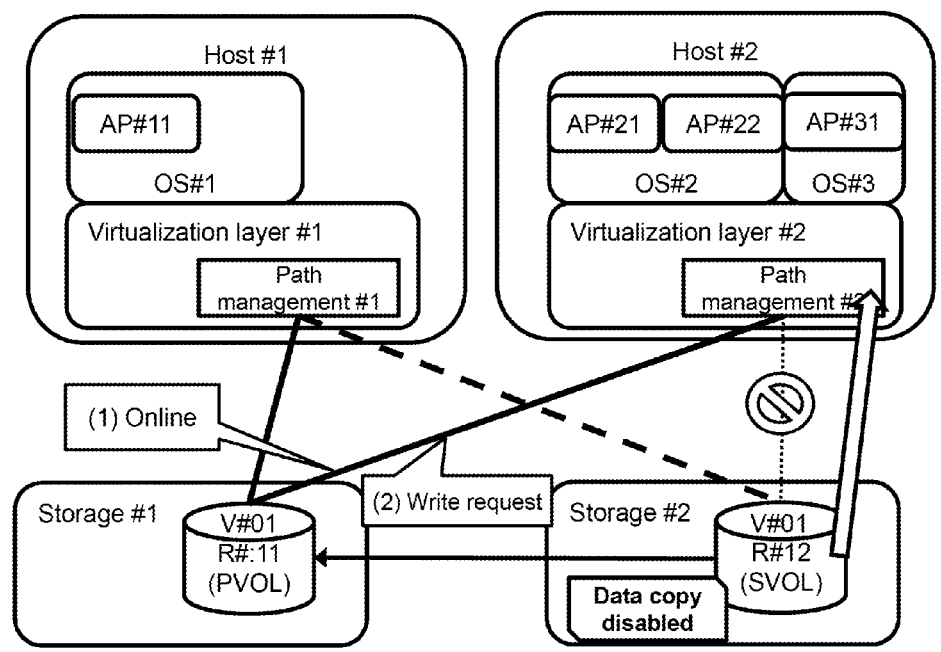
FIG. 18 is a fourth diagram illustrating the process after recovery from the failure.
Figure 19:
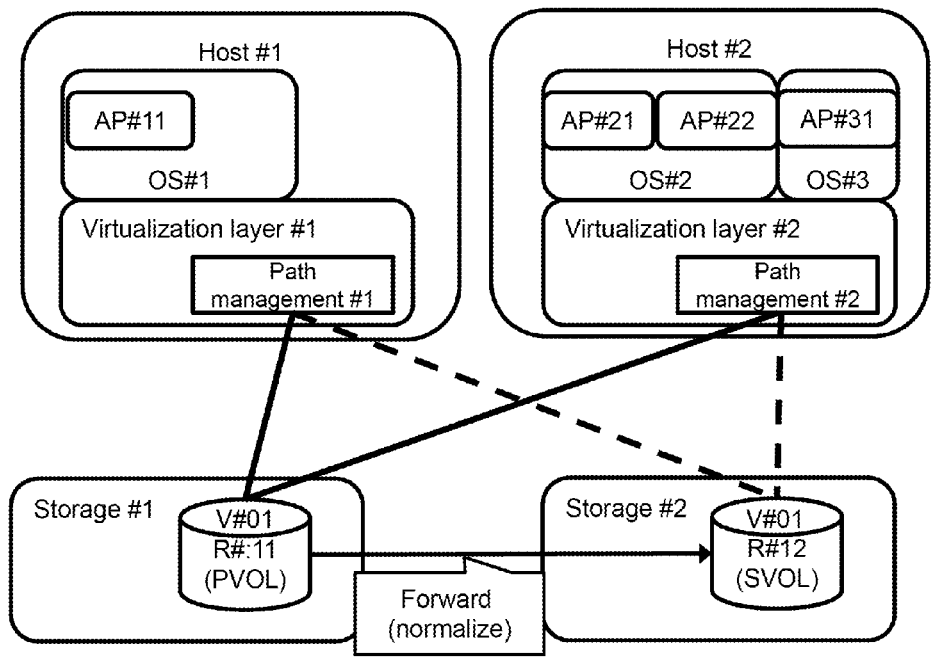
FIG. 19 is a fifth diagram illustrating the process after recovery from the failure.

As illustrated in FIG. 17, the path management #2 changes the status of the third path from online (D) to online ((1) in FIG. 18), and transmits a write request specifying the PVOL as a write destination using the third path ((2) in FIG. 18). Accordingly, the host #2 can access the PVOL using the third path when receiving the predetermined error response regarding the fourth path. Even when there is a host that can manage and use a path connecting to the SVOL (VOL of R#12) besides the host #2, such a host can access the PVOL by performing a process similar to the one as performed by the host #2. In other words, even if the number of hosts is large, recovery from a failure can be carried out in a scalable manner.

After the status illustrated in FIG. 18, the storages #1 and #2 resume forward copying in response to an instruction for forward copying. As a result, the storage #2 cancels the status of disabling data copying to the SVOL. Accordingly, the information system returns to the normal status (first system status) illustrated in FIG. 10. Therefore, even when a failure to prevent the storage #1 from accessing to the PVOL occurs again thereafter, a failover can be carried out.

The above is the description of the embodiment. Variations of the above-described embodiment are feasible. The following describes the variations in comparison with the embodiment as needed (the description being focused particularly on the statuses of paths, the status of mirroring, and the direction of mirroring (copying)).

Figure 20:
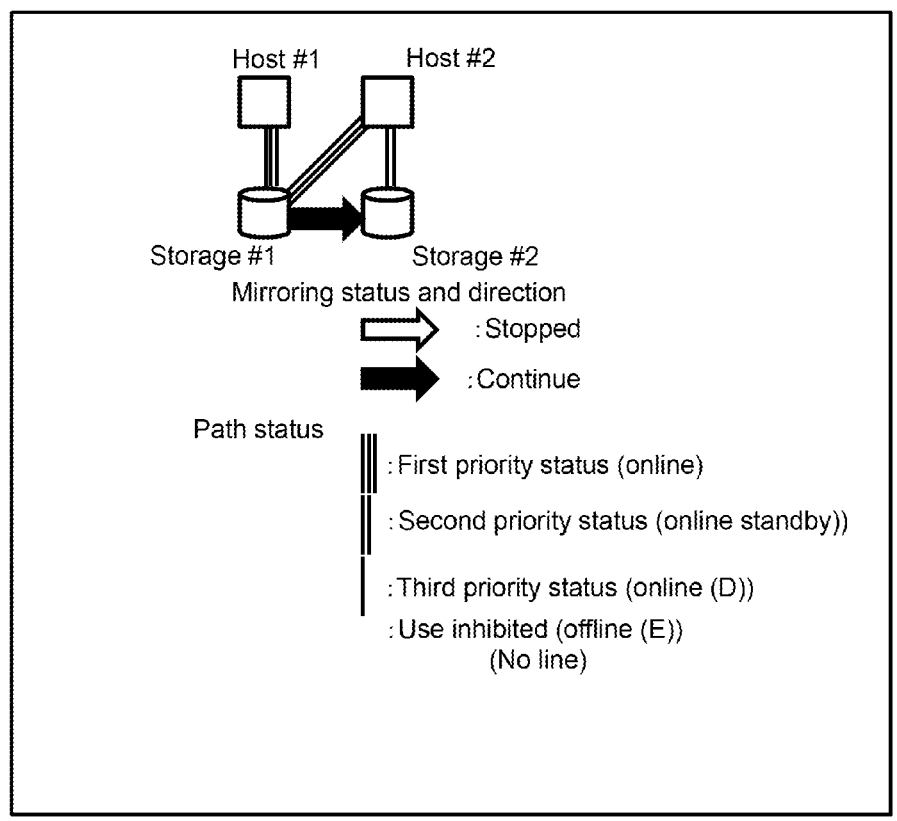
FIG. 20 is a diagram illustrating drawing notations of FIGS. 21 to 27.

FIG. 20 is a diagram illustrating drawing notations of FIGS. 21 to 27.

In FIGS. 21 to 27, as illustrated in FIG. 20, individual rectangles represent the hosts #1 and #2, individual disk symbols represent the storages #1 and #2, and paths between those components are denoted by modes corresponding to the statuses of the paths. The path connecting to the storage #1 indicates a path to the PVOL of the storage #1, and the path connecting to the storage #2 indicates a path to the SVOL that is a copy pair with the PVOL. It is to be noted that those PVOL and SVOL are recognized as a single VOL by the APs of the hosts #1 and #2. With regard to the status of a path, a first priority status corresponding to "online" is indicated by three lines, a second priority status corresponding to "online standby" is indicated by two lines, a third priority status corresponding to "online (D)" is indicated by a single line, and a use inhibited status corresponding to "offline (E)" is shown without a line.

With regard to the remote data mirroring process, the direction in which data is copied is indicated by an arrow, and whether the remote data mirroring process is stopped or is ongoing is indicated by the color of the arrow. Specifically, a white arrow indicates that the remote data mirroring process is stopped, and a black arrow indicates that the remote data mirroring process is ongoing.

Figure 21:
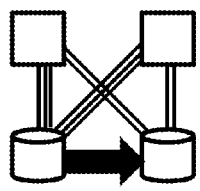
FIG. 21 is a diagram illustrating a normal status.

When the information system is in the normal status (first system status), as illustrated in FIG. 21, the first path is in the first priority status, and the second path is in the second priority status. Apparently, the first path is in a higher priority status than the second path. This setting is intended to prevent data not present in the PVOL from being written in the SVOL upon generation of a write request specifying the SVOL as a write destination, which would occur if the priorities of those paths were set equal to each other. According to the embodiment, the priorities of the first and second paths are set to be different from each other always, not only in the normal status. The third path is in the first priority status, and the fourth path is in the second priority status. According to the embodiment, the priorities of the third and fourth paths are set to be different from each other always, not only in the normal status.

In the normal status, the storages #1 and #2 carry out forward copying which is remote data mirroring from the PVOL to the SVOL.

Figure 22A:
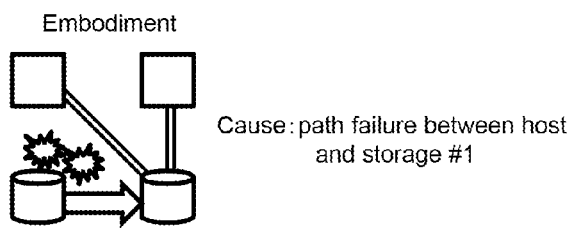
FIG. 22A is a diagram illustrating a first example of a failure.
Figure 22B:
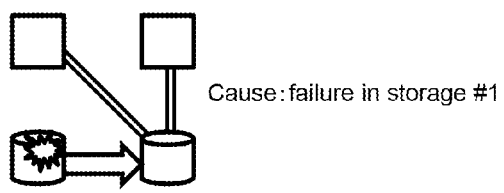
FIG. 22B is a diagram illustrating a second example of a failure.
Figure 22C:
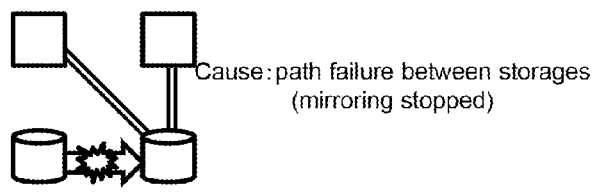
FIG. 22C is a diagram illustrating a third example of a failure.

A possible cause for a failure such that access to the PVOL from a host is disabled is the occurrence of a failure in the path that connects the host to the PVOL as illustrated in FIG. 22A, the occurrence of a failure in the storage #1 as illustrated in FIG. 22B, or the occurrence of a failure in the path between the storage #1 and the storage #2 as illustrated in FIG. 22C.

When a failure occurs, the path management program 124 of the host #1 sets the first path in a use inhibited status, and the path management program 124 of the host #2 sets the first path in a use inhibited status. In addition, forward copying is stopped.

Until the failure that prevents the storage #1 from accessing the PVOL is cleared, a write request from the host #1 is transmitted using the second path in the second priority status, and a write request from the host #2 is transmitted using the fourth path in the second priority status.

Figure 23:
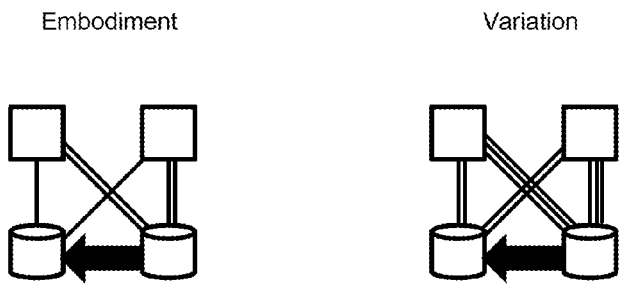
FIG. 23 is a first diagram illustrating a status immediately after recovery from a failure.

In a status immediate after recovery from the failure that prevents access to the PVOL (third system status), as illustrated in FIG. 23, the status of the first path is set to the third priority status, and the status of the second path is set to the second priority status according to the embodiment. Accordingly, the write request from the host #1 is transmitted using the second path in the second priority status. Further, the status of the third path is set to the third priority status, and the status of the fourth path is set to the second priority status. Accordingly, the write request from the host #2 is transmitted using the fourth path in the second priority status. In addition, reverse copying which is the remote data mirroring from the SVOL to the PVOL starts.

Although the third priority status is used in the embodiment, the third priority status may not be used as illustrated in a variation. That is, the path management program 124 of the host #1 may set the status of the first path to the second priority status, and set the status of the second path to the first priority status. Further, the path management program 124 of the host #2 may set the status of the third path to the second priority status, and set the status of the fourth path to the first priority status.

The use of the third priority status as in the embodiment can permit the statuses of the first path and the third path to be clearly managed to be statuses different from the second priority status in the case where the information system is normal. For example, the statuses of the paths may be displayed on the display device 160 of the host 100 to allow the use of the host 100 to recognize the statuses of the paths.

Figure 24:
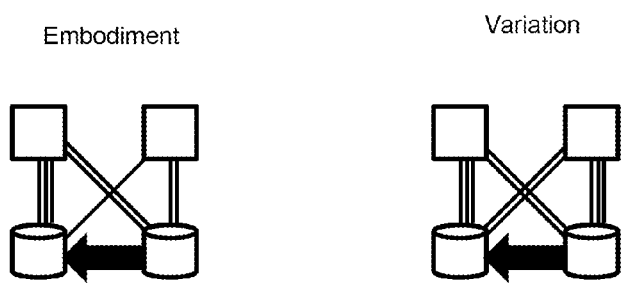
FIG. 24 is a first diagram illustrating a process after recovery from a failure.

It is assumed that the priority of the first path is changed to be higher than the priority of the fourth path after recovery from a failure in the information system as illustrated in FIG. 24. Specifically, the path management program 124 of the host #1 changes the status of the first path from the third priority status to the first priority status. Accordingly, the write request from the host #1 is transmitted using the first path in the first priority status.

According to the variation, by way of contrast, the path management program 124 of the host #1 changes the status of the first path from the second priority status to the first priority status, and changes the status of the second path from the first priority status to the second priority status. Accordingly, the write request from the host #1 is transmitted using the first path in the first priority status.

Figure 25:
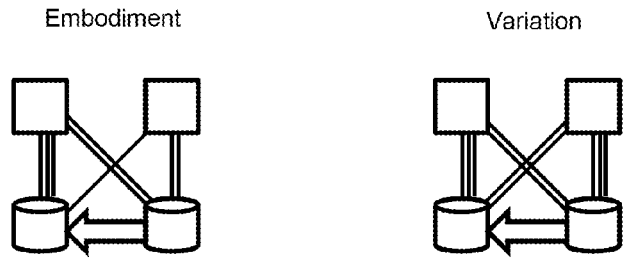
FIG. 25 is a second diagram illustrating the process after recovery from the failure.

According to the embodiment, as illustrated in FIG. 25, when the storage #1 receives a write request specifying the PVOL which is the target of reverse copying as a write destination, the storage #1 transmits an error notification to the storage #2. Upon reception of the error notification, the storage #2 stops the reverse copying, and, upon reception of a write request specifying the SVOL as a write destination, returns a predetermined error response to the sender of the write request.

According to the variation, when the storage #1 receives a write request specifying the PVOL which is the target of reverse copying as a write destination, a process similar to the one performed in the embodiment is performed.

Figure 26:
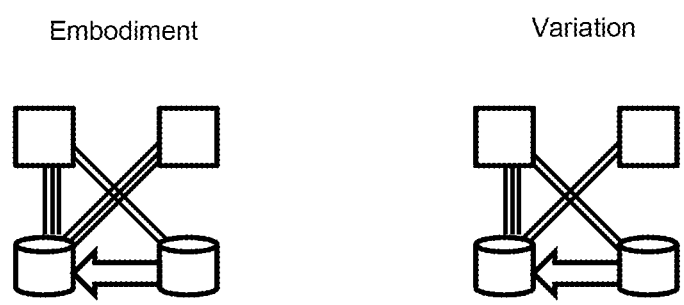
FIG. 26 is a third diagram illustrating the process after recovery from the failure.

According to the embodiment, as illustrated in FIG. 26, when the storage #2 receives a write request specifying the SVOL as a write destination from the host #2 via the fourth path, the storage #2 returns a predetermined error response to the host #2. Upon reception of the predetermined error response, the host #2 changes the status of the fourth path to a use inhibited status, changes the status of the third path from the third priority status to the first priority status, and uses the third path to transmit a write request specifying the same data as data to be written according to the write request corresponding to the predetermined error response (failed write request) as data to be written and specifying the PVOL as a write destination. Accordingly, the storage #1 performs a process corresponding to the write request transmitted by the host #2. FIG. 26 illustrates, besides the host #1, only the host #2 as a host using the same VOL; if there is another host using the same VOL besides the host #2, however, that host performs a process similar to the process performed by the host #2. Even when there are a plurality of hosts using the same VOL besides the host #1, therefore, status of the path between each of those hosts and the storage #1 is set to the first priority status, and a write request is transmitted to the storage #1 using that path through a process similar to the above-described process. As a result, the APs in a plurality of hosts keep executing their works.

According to the variation, as illustrated in FIG. 26, when the storage #2 receives a write request specifying the SVOL as a write destination from the host #2, the storage #2 returns a predetermined error response to the host #2. Upon reception of the predetermined error response, the host #2 changes the status of the fourth path to a use inhibited status, and uses the third path in the second priority status to transmit a write request specifying the same data as data to be written according to the write request corresponding to the predetermined error response (failed write request) as data to be written and specifying the PVOL as a write destination. Accordingly, the storage #1 performs a process corresponding to the write request transmitted by the host #2.

Figure 27:
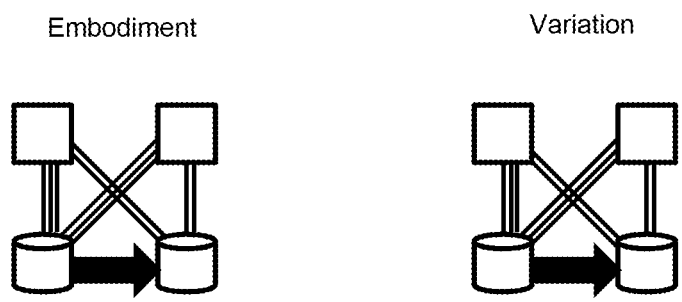
FIG. 27 is a fourth diagram illustrating the process after recovery from the failure.

According to the embodiment, as illustrated in FIG. 27, the storages #1 and #2 start forward copying from the PVOL to the SVOL. As a result, the status of the information system is recovered to the normal status illustrated in FIG. 21.

According to the variation, by way of contrast, the storages #1 and #2 start forward copying from the PVOL to the SVOL. In addition, the path management program 124 of the host #2 sets the status of the third path to the first priority status, and sets the status of the fourth path to the second priority status. As a result, the status of the information system is recovered to the normal status illustrated in FIG. 21.

Figure 28:
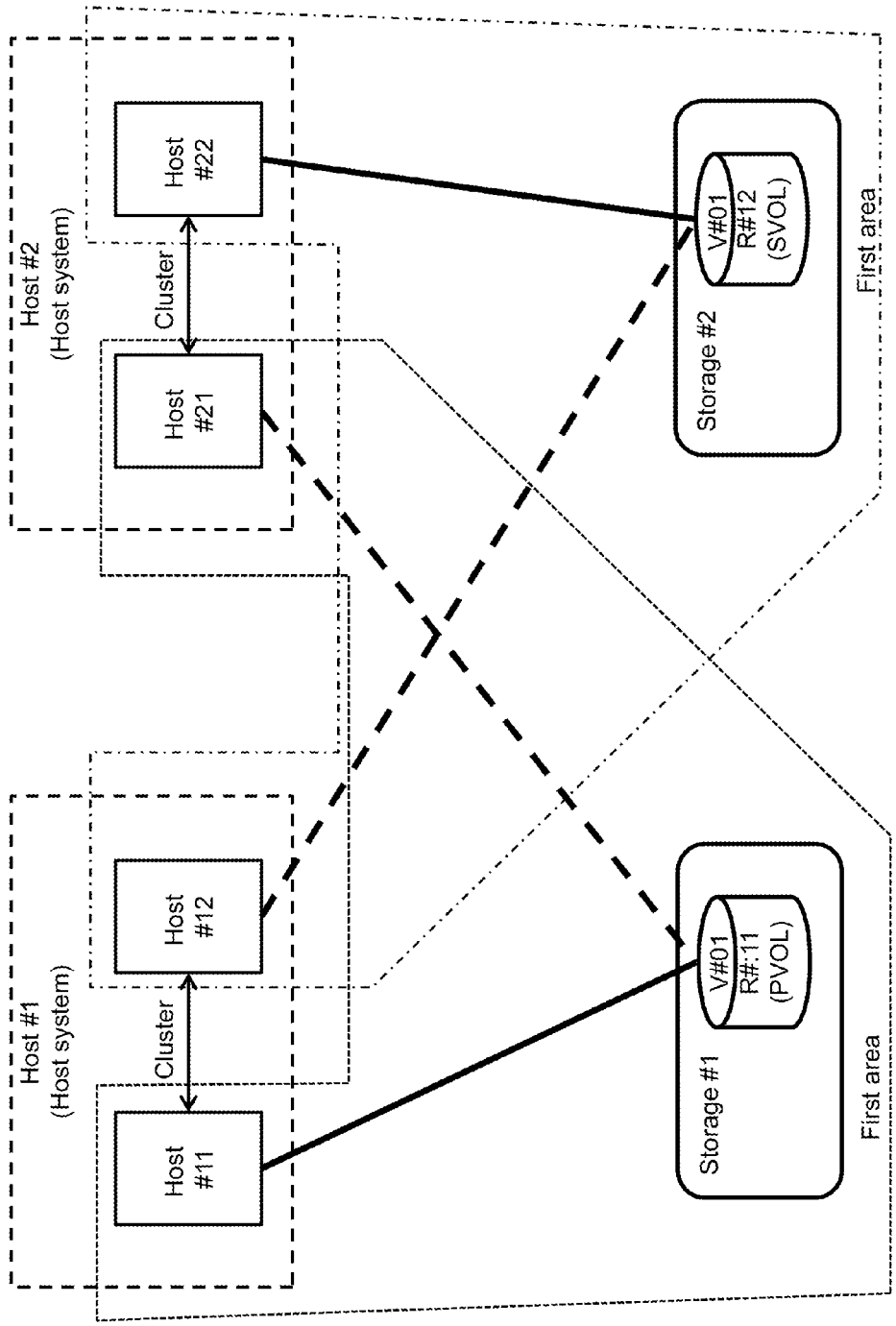
FIG. 28 is a configurational diagram of an information system according to a variation.

FIG. 28 is a configurational diagram of an information system according to a variation.

Although the host system is illustrated to be a single host computer as an example according to the embodiment, the host system may be configured as illustrated in FIG. 28. That is, the information system may be a cluster system in which the host #1 includes hosts #11 and #12. The host #11 is a computer which is located in a first region to which the storage #1 belongs, and is connected in a communicatable manner only to the storage #1 in the storages #1 and #2. The host #12 is a computer which is located in a second region to which the storage #2 belongs, and is connected in a communicatable manner only to the storage #2 in the storages #1 and #2. Alternatively, the information system may be a cluster system in which the host #2 includes hosts #21 and #22. The host #21 is a computer which is located in a first region to which the storage #1 belongs, and is connected in a communicatable manner only to the storage #1 in the storages #1 and #2. The host #22 is a computer which is located in a second region to which the storage #2 belongs, and is connected in a communicatable manner only to the storage #2 in the storages #1 and #2.

The embodiment and some variations have been described above. However, the present invention is not limited to the embodiment and the variations, and may of course be modified in various forms without departing from the subject matter of the invention. For example, whether or not to perform the above-described process when the host #2 receives a predetermined error response may be determined according to a predetermined rule (e.g., configuration set by a user in advance). Further, when the host #2 receives a predetermined error response, the path management program of the host #2 may display information for the user to determine whether the third path should be changed to online, and receive the user's decision.

REFERENCE SIGNS LIST

100 Host system
300 Primary storage system
400 Secondary storage system

The invention claimed is:
1. An information system comprising:
a first storage system configured to provide a first storage area;
a second storage system configured to provide a second storage area paired with the first storage area; and
a first host system and a second host system coupled to the first and second storage systems and configured to transmit write requests, wherein
(A) in a first system status that is in a normal status,
the first and second storage systems perform a first remote data mirroring process in which the first storage area is a source, and the second storage area is a target,
a first path connecting the first host system to the first storage area is in a status representing that the first path has a higher priority than a second path connecting the first host system to the second storage area, and
a third path connecting the second host system to the first storage area is in a status representing that the third path has a higher priority than a fourth path connecting the second host system to the second storage area,
(B) in a second system status that is brought about when the first storage system fails a process according to the write request received from the first or second host system in the first system status,
each of the first and third paths is in a status representing inhibition of transmission of the write request using the path, and
the first and second storage systems stop the first remote data mirroring process,
(C) in a third system status that represents recovery in the second system status to a situation where the first and second host systems are permitted to transmit the write requests to the first storage system,
the first and second storage systems perform a second remote data mirroring process in which the second storage area is a source, and the first storage area is a target,
the first path is in a status representing that the priority of the first path is lower than the priority of the second path, and
the third path is in a status representing that the priority of the third path is lower than the priority of the fourth path,
(D) upon transition to a status representing that the priority of the first path is higher than the priority of the second path in the third system status,
(1) the first host system transmits the write request to the first storage system using the first path,
(2) the first storage system receives the write request from the first host system, detects that the first storage area which is a write destination according to the received write request is the target in the second remote data mirroring process, transmits a stop notification to stop the second remote data mirroring process to the second storage system, and stops the second remote data mirroring process,
(3) the second storage system receives the stop notification, and changes control so that a write request specifying the second storage area as a write destination fails, and
(4) the second host system transmits the write request specifying the second storage area as the write destination to the second storage system using the fourth path, and transmits the write request using the third path which is in a status representing that the priority of the third path is lower than the priority of the fourth path when the write request fails.
2. An information system according to claim 1, wherein in the (3), because the second storage area does not hold latest data, the second storage system transmits a predetermined error response indicating that the write request specifying the second storage area as the write destination has failed to the second host system, and wherein in the (4), upon reception of the predetermined error response, the second host system transmits the write request to the first storage system using the third.

3. An information system according to claim 2,
wherein in the (4), the second host system transitions the status of the third path to a status where the third path has a higher priority than the fourth path.

4. An information system according to claim 3,
wherein after the (4), the first and second storage systems perform the first remote data mirroring process, and the second storage system changes control to terminate the control such that the write request specifying the second storage area as the write destination fails.

5. An information system according to claim 1,
wherein the status of each of the first to fourth paths is in any one of:
a first priority status representing that a write request is transmittable,
a second priority status representing that a write request is transmittable when there is not a path in the first priority status,
a third priority status representing that a write request is transmittable when neither a path in the first priority status nor a path in the second priority status exists, and
a use inhibited status representing that a write request is not permitted to be transmitted,
wherein in the first system status, the status of each of the first and third paths is the first priority status, and the status of each of the second and fourth paths is the second priority status, and
wherein in the third system status, the status of each of the first and third paths is the third priority status, and the status of each of the second and fourth paths is the second priority status.

6. An information system according to claim 1,
wherein each of the first and second host systems has a virtualization layer that executes a virtual machine, and
wherein an execution image of a first virtual machine that is executed by one of the first and second host systems or data used by the first virtual machine is stored in the first storage area, the first virtual machine is movable to an other one of the first and second host systems, and as the first virtual machine is executed by both of the first and second host systems, a write request specifying the first storage area as a write destination is transmittable from both of the first and second host systems.

7. An information system according to claim 1,
wherein the priority of the first path and the priority of the second path always differ from each other.

8. An information system according to claim 1,
wherein at least one of the first and second host systems is a single computer, or is a cluster system including a first computer accessible only by the first storage system in the first and second storage systems, and a second computer accessible only by the second storage system in the first and second storage systems.

9. A host system comprising:
a communication interface device coupled to a first storage system configured to provide a first storage area and a second storage system configured to provide a second storage area paired with the first storage area;
a storage device configured to store information on a first path coupled to the first storage area and information on a second path coupled to the second storage area; and
a processor coupled to the communication interface device and the storage device,
wherein the processor transmits a write request specifying the second storage area as a write destination, and
transmits a write request specifying the first storage area as a write destination to the first storage system using the first path whose priority is lower than the priority of the second path when the transmitted write request fails because the second storage system receives a stop notification to stop a remote data mirroring process from the first storage system to thereby change control to perform control such that the write request specifying the second storage area as the write destination fails.

10. A host system according to claim 9,
wherein failure of the write request is reception of a predetermined error response from the second storage system.

11. A host system according to claim 10,
wherein upon reception of the predetermined error response, the processor sets a status of the first path to have a higher priority than the second path.

12. A host system according to claim 9,
wherein the host system is a single computer, or is a cluster system including a first computer accessible only by the first storage system in the first and second storage systems, and a second computer accessible only by the second storage system in the first and second storage systems.

13. An access control method in an information system including a first storage system configured to provide a first storage area, a second storage system configured to provide a second storage area paired with the first storage area, and a first host system and a second host system coupled to the first and second storage systems and configured to transmit write requests, wherein (A) in a first system status that is in a normal status,
the first and second storage systems perform a first remote data mirroring process in which the first storage area is a source, and the second storage area is a target,
a first path connecting the first host system to the first storage area is in a status representing that the first path has a higher priority than a second path connecting the first host system to the second storage area, and
a third path connecting the second host system to the first storage area is in a status representing that the third path has a higher priority than a fourth path connecting the second host system to the second storage area, (B) in a second system status that is brought about when the first storage system fails a process according to the write request received from the first or second host system in the first system status,
each of the first and third paths is in a status representing inhibition of transmission of the write request using the path, and
the first and second storage systems stop the first remote data mirroring process, (C) in a third system status that represents recovery in the second system status to a situation where the first and second host systems are permitted to transmit the write requests to the first storage system,
the first and second storage systems perform a second remote data mirroring process in which the second storage area is a source, and the first storage area is a target,
the first path is in a status representing that the priority of the first path is lower than the priority of the second path, and
the third path is in a status representing that the priority of the third path is lower than the priority of the fourth path, (D) upon transition to a status representing that the priority of the first path is higher than the priority of the second path in the third system status,
(1) the first host system transmits the write request to the first storage system using the first path,
(2) the first storage system receives the write request from the first host system, detects that the first storage area which is a write destination according to the received write request is the target in the second remote data mirroring process, transmits a stop notification to stop the second remote data mirroring process to the second storage system, and stops the second remote data mirroring process,
(3) the second storage system receives the stop notification, and changes control so that a write request specifying the second storage area as a write destination fails, and
(4) the second host system transmits the write request specifying the second storage area as the write destination to the second storage system using the fourth path, and transmits the write request using the third path which is in a status representing that the priority of the third path is lower than the priority of the fourth path when the write request fails.

14. An access control method according to claim 13,
wherein in the (3), because the second storage area does not hold latest data, the second storage system transmits a predetermined error response indicating that the write request specifying the second storage area as the write destination has failed to the second host system, and
wherein in the (4), upon reception of the predetermined error response, the second host system transmits the write request to the first storage system using the third.

15. An access control method according to claim 13,
wherein in the (4), the second host system transitions the status of the third path to a status where the third path has a higher priority than the fourth path.

* * * * *